Figure 1:
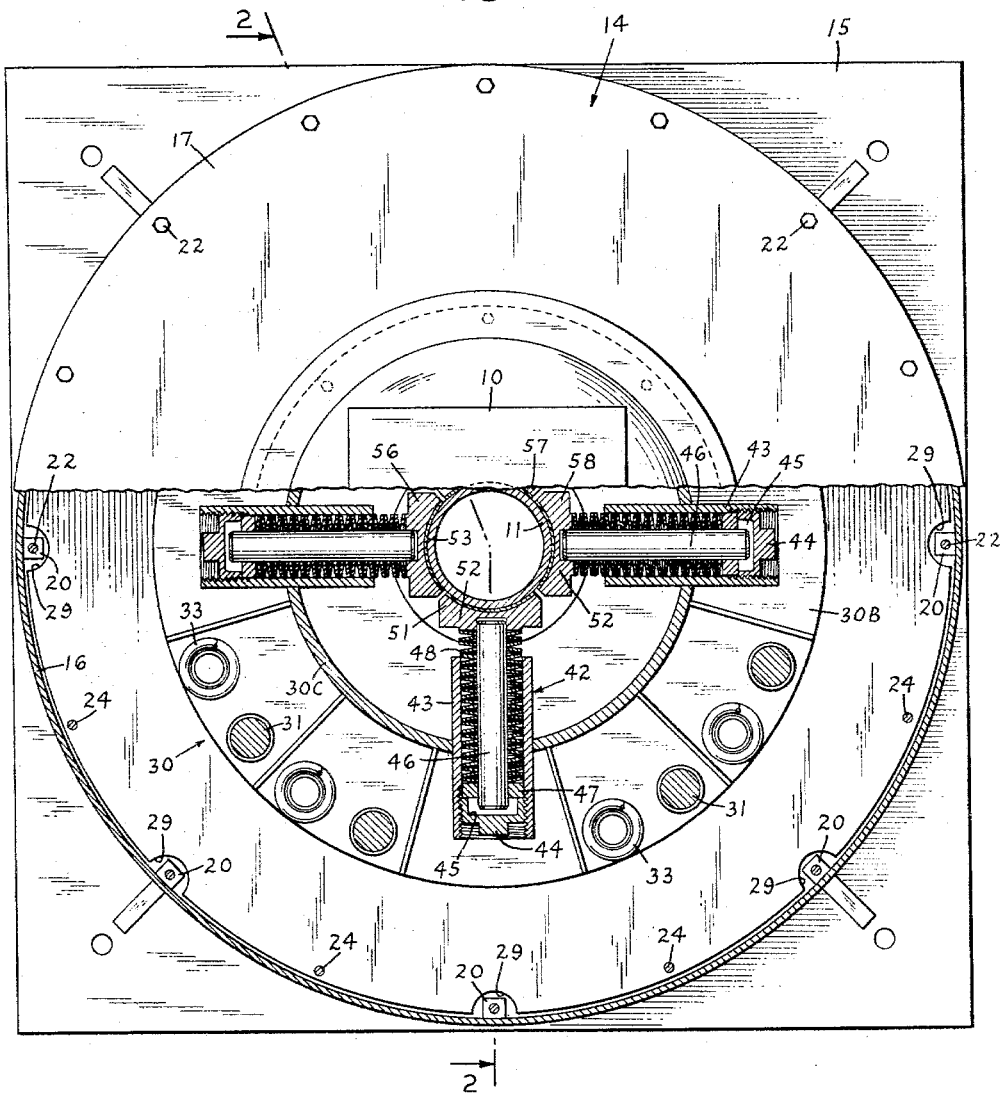

May 10, 1966  N. F. KFOURY ETAL  3,250,508
ALL-DIRECTIONAL FRICTIONAL DAMPER
Filed March 26, 1964  2 Sheets-Sheet 1

INVENTORS:
NICHOLAS F. KFOURY
PAUL BARATOFF
BILLY Y. K. MUI
BY

THEIR ATTORNEYS

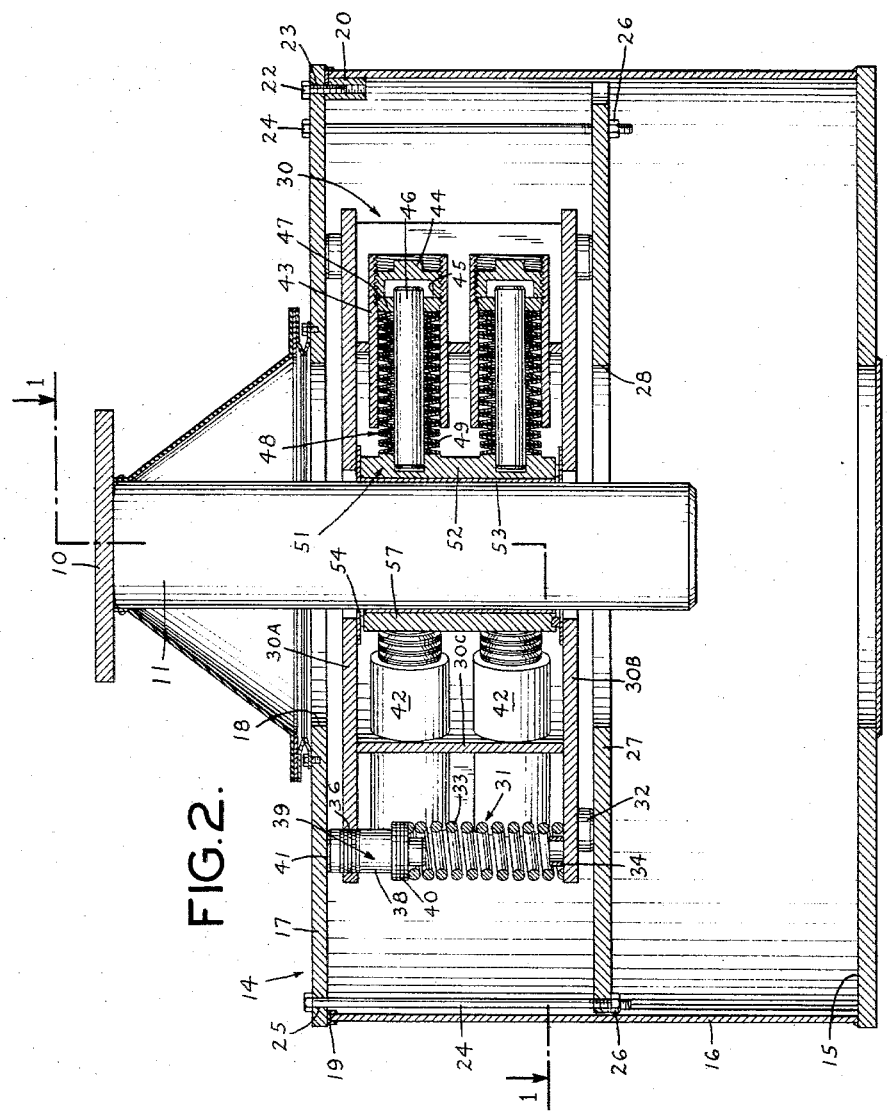

United States Patent Office 3,250,508
Patented May 10, 1966

3,250,508
ALL-DIRECTIONAL FRICTIONAL DAMPER
Nicholas F. Kfoury, Manorhaven, Paul Baratoff, Jackson Heights, and Billy Y. K. Mui, Astoria, N.Y., assignors to Korfund Dynamics Corporation, Long Island, N.Y., a corporation of New York
Filed Mar. 26, 1964, Ser. No. 354,852
6 Claims. (Cl. 248—358)

This invention relates to vibration dampers and relates particularly to dampers for damping vibrations in all directions.

In accordance with the invention, a novel form of vibration damper is provided which is capable of dampening vibrations which occur in any direction and with essentially constant damping action regardless of the direction or amplitude of the vibration.

More particularly, in accordance with the invention, the vibration damper is provided with friction elements engageable with a moving part which are biased against that part with substantially constant pressure and frictionally oppose movements of the part. Lateral movement of the part is damped by friction elements, which also oppose lateral vibration, with substantially constant resistance by applying an additively constant force normal to the surfaces frictionally retarding lateral movement, regardless of the extent of the opposed vibration or the angular orientation of the vibration forces. The vibration damper thereby produces an efficient, uniform attenuation of vibrations in all directions.

A typical vibration damper includes a first housing having an aperture in the top thereof and a smaller housing with openings slidably mounted therein by means of spring-biased friction members interposed between the housings and normal to the top and bottom of the first housing. A member subjected to vibratory forces is slidably and frictionally engaged by a plurality of spring biased friction elements carried by the smaller housing to dissipate vertically directed vibrations. Thus by mounting the smaller housing within the first housing so that the sum of the forces applied to the friction elements between the two housings is constant, vibrations occurring in any direction are effectively dissipated by the damper.

The new dampers are useful for isolating machines, instruments and the like, from sources of shock and vibration.

For a better understanding of the present invention, reference may be had to the accompanying drawings in which:

FIGURE 1 is a plan view in partial section taken along the line 1—1 of FIGURE 2, through a typical vibration damper embodying the present invention; and FIGURE 2 is a view in vertical section taken on the line 2—2 of FIGURE 1.

For purpose of illustration, the new vibration damper embodying the present invention will be described in connection with a mass 10, such as an instrument platform, a machine base or the like, which is supported by means of springs or the like (not shown) and has a depending cylindrical member or shaft 11.

A typical vibration damper embodying the present invention as illustrated in FIGURES 1 and 2 includes a housing 14 which may be of any suitable shape, such as cylindrical, rectangular, or the like, and having a base 15 and a side or sides 16. The top 17 of the housing has a circular aperture 18 of substantially greater diameter than that of the shaft 11. The top 17 is mounted on the upper edge of the side 16 of the housing 14 and seated on a gasket 19, interposed between the upper edge of the side 16 and the top 17. Screws or the like, 22 received in holes 23 formed near the edge of the top 17 extend through it and engage in lugs 20 on the side 16 near the upper edge thereof.

Bolts 24 extend through apertures 25 formed in the peripheral portion of the top 17, approximately to the horizontal mid-plane of the housing 14. The bolts 24 receive nuts 26 which engage and support thereon a horizontally disposed plate member or partition 27 having a centrally disposed circular aperture 28 of diameter substantially greater than that of the diameter of the shaft 11 which protrudes therethrough. Semicircular notches 29 (FIGURE 1) formed at regular intervals in the periphery of the partition 27 permit the partition 27 to be inserted into the housing 14 during assembly without engaging the lugs 20.

Within the housing 14, is a second, smaller housing 30 of less height and less transverse dimensions than the first housing 14 so that it is capable of substantial movement in all directions within the housing 14. The smaller housing may be introduced into the first housing 14 by placing the assembled smaller housing 30 on the plate 27 of the housing 14 and securing the top 17 to the plate 27 by the screws 24.

The housing 30 has upper and lower plates 30A and 30B and a side wall 30C disposed inwardly of the edges of the plates 30A and 30B.

An array of vertically biased friction means 31 is slidably received in the periphery of the upper plate 30A to slidably engage the top 17. Alternately interspersed with the friction means 31 are downwardly biased friction means 32, mounted in the periphery of the lower plate 30B for slidably engaging the partition of the housing 14. The pressures applied by, and number of these friction members 31 and 32 will determine the friction and the amount of damping in the lateral movement of the small housing 30. The pressure exerted by the friction members can be regulated by adjusting the spacing between the partition 27 and the top 17 of the housing.

All of the members 31 and 32 are essentially the same, structurally, and only one of them will be described. The friction member 31 includes a coil spring 33 having one end engaged around a vertically disposed spring guide 34 on the inner surface of the lower plate 30B in alignment with a corresponding aperture 36 formed in the upper plate 30A, a headed plunger 39 provided with circumferential bushing 38 is received within the aperture 36 for vertical sliding movement. The inner end of the plunger 39 receives the spring 33 which bears against washer-spacers 40 for adjustment of spring 31 height and pressure.

A layer of friction material 41, such as material used for automotive brake linings, sintered metal brake lining material or the like, is attached to the surface of the headed portion of the friction plunger 39 in contact with the end plate 17 to frictionally resist transverse motion of the small housing 30. If desired, the brake or friction material may be mounted on the end plate 17. The plungers 32 are similarly mounted in the housing 30 and bear against the partition plate 27. It will be understood that the plungers 31 and 32 can be mounted in the cover 17 and the partition 27 to frictionally engage the top and bottom of the housing 30, if desired.

With the structure thus described, it will be clear that the array of friction members or plungers 31 and 32 will be urged against the top 17 and partition 27, respectively, of the first housing 14 and inasmuch as they are in slidable engagement therewith, they frictionally oppose lateral movement of the housing 30. The springs 33, each having substantially the same load-rate, apply frictional forces against the top 17 and partition 27 of the first housing 14, which, added together, are a constant value. Thus if the housing 30 is moved vertically downward, the forces urging the friction means 32 against the partition 27 of the housing 14 are increased, while the same downward movement of the housing 30 reduces the pressure applied by the springs 33 urging the friction means 31 against the top 17 of the housing 14 and reduces the friction force between the top 17 and the friction means 31 by an equal amount. Similarly, if the housing 30 is moved upwardly, the plungers 31 will be pressed with increased pressure against the top and the plungers 32 will be pressed with lesser pressure against the partition 27. Thus:

$$F_{17}+F_{27}=K$$

Where:

$F_{17}$ is the friction force established between the top 17 and the array of friction means 31;

$F_{27}$ is the friction force established between the bottom 27 and the array of friction means 32; and K is a preselected constant value of friction force resisting lateral movement of the housing 30.

The side wall 30C of the housing 30 supports a plurality of friction members 42 for dissipating vertical vibrations of the shaft. Each friction member 42 includes a horizontal tube 43 radially disposed relative to the shaft 11 within the housing 30. The end of each tube 43, disposed radially away from the shaft 11, is suitably threaded to receive an adjusting member 44 having an inwardly facing recess 45. The outer end of a radially disposed shaft 46 is received within the recess 45 and is slidably supported by means of a washer-like guide 47 therein seated against the inwardly disposed periphery of the adjusting member 44.

Biasing means, such as the spring 48 shown in FIGURES 1 and 2, formed by arranging opposing pairs of dish-like spring washers 49 on each of the shafts 46 urge friction members 51, 56, 57 and 58 against quadrants of the shaft 11. Each friction member 51, 56, 57 and 58 is a plate 52 of generally rectangular shape and has a concave face complemental to the shaft 11. A layer of friction material 53 is bonded to the concave face. The inner end of each shaft 46 is fixed in a recess formed in the outer side of a corresponding friction member 51, 56, 57 or 58. As shown in FIGURE 2, each friction member is guided and biased by means of a pair of spring units of the type described. While four friction members 51, 56, 57 and 58 are illustrated, two, three or more than four such elements can be provided if desired.

The biasing force of the springs 48 may also be varied, by selectively compressing the spring 48 against the backing 52 by means of the threaded adjusting member 44. The friction members 51, 56, 57 and 58 bear against the top and bottom of the housing 30, and upper and lower layers 54 and 55 of bearing material may be interposed between the ends of friction members 51, 56, 57 and 58 and the top 30A and bottom 30B of the housing 30. With the structure thus described, it will be clear that the friction members 51, 56, 57 and 58 will be urged against the shaft 11 with substantially constant damping effect and inasmuch as they are in slidable engagement with the top and bottom of the housing 30, they move with the housing 30 and frictionally oppose the vertical and rotational movement of the shaft 33 with constant pressure.

From the preceding description of a typical vibration damper embodying the invention, it will be clear that the friction members 51, 56, 57 and 58 are biased against the shaft with a constant pressure affected negligibly by vertical movements of the shaft. Inasmuch as the members 51, 56, 57 and 58 are movable with the housing 30, lateral movement of the shaft and the housing with the shaft does not modify the additive pressures with which the friction members engage the shaft. Lateral movement of the housing 30 is also opposed with uniform friction because vertical movement of the housing 30 with the shaft due to frictional engagement between the shaft 11 and the friction members 51, 56, 57 and 58, has no effect on the total pressure exerted by the friction members 31 and 32. A lessening of the pressure exerted by the friction members 31 is accompanied by an increase in the pressure of the friction members 32, and vice versa, so that the total remains the same. Accordingly, a uniform dampening in all directions is obtained with the new damper regardless of the direction or amplitude of the vibration within the capacity of the damper.

While dampers of the type disclosed herein are adapted particularly for heavy duty service for damping powerful vibrations of substantial amplitude, nevertheless they can be made in smaller sizes for use with light machinery applications, for laboratory equipment, such as scales and the like, and the springs and friction material used therein can be varied in accordance with the purpose desired.

Accordingly, the form of the invention described herein should be considered as illustrative.

We claim:

1. A vibration damper, comprising a shaft adapted to be attached to a vibratile member, friction members engaging said shaft slidably, means biasing said friction members against said shaft, a housing slidably receiving said shaft for relative axial movement and movable with said shaft in directions transverse to said axis of said shaft, said friction members and said biasing means being mounted in said housing, a fixed member disposed above said housing and in a plane substantially perpendicular to said shaft, a plate member disposed below said housing and in a plane substantially perpendicular to said shaft, and oppositely spring biased friction means interposed between and engaging the housing and said fixed member and the housing and said plate member for frictionally opposing movement of said housing relative to said fixed member and said plate member.

2. A vibration damper comprising a shaft, friction members engaging said shaft slidably and frictionally resisting axial sliding movement of said shaft, a pair of friction elements respectively disposed in spaced-apart planes substantially perpendicular to said shaft, and means in frictional engagement with said pair of friction elements for resiliently supporting said friction members between said pair of friction elements and frictionally resisting movement of said shaft in a plane perpendicular thereto.

3. A vibration damper comprising a housing having upper and lower plate members having aligned apertures therein, a smaller housing between said upper and lower plate members, said smaller housing having a top plate and a bottom plate opposing said upper and lower plate members respectively and having aligned openings in said top and bottom plates, friction means mounted movably in said top and bottom plates and springs in said smaller housing biasing said friction means against said upper and lower plate members, a shaft extending through said apertures and said aligned openings and spaced from said top, sides and plate member of said housing, friction members movably mounted in said smaller housing for engaging said shaft, and spring means in said smaller housing for biasing said friction members against said shaft.

4. The vibration damper set forth in claim 3 in which said shaft is of circular cross-section and said friction members have complementally shaped surfaces peripherally engaging said shaft.

5. A vibration damper comprising an element to be damped, a first friction member slidably engaging said element and frictionally resisting movement of said element in one direction, a pair of fixed members generally perpendicular to said direction of element movement, means movably supporting said first friction member between said pair of fixed members, said movable supporting means having oppositely disposed surfaces respectively adjacent respective ones of said pairs of fixed members, a plurality of second friction members interposed between each of said oppositely disposed surfaces of said movable support means and an adjacent one of said pair of fixed members resiliently supporting said movable supporting means therebetween and frictionally resisting movement generally perpendicular to said one direction.

6. A vibration damper comprising a first housing having sides, top and bottom, said top and bottom having aligned apertures therein, a second housing having sides, top and bottom with aligned top and bottom openings, said second housing being smaller than and disposed within said first housing and movable in any horizontal direction relative thereto, a first group of friction members mounted in the top of one of said housings and movable into engagement with the top of the other housing, a second group of friction members mounted in the bottom of one of said housings and movable into engagement with the bottom of the other housing, spring means urging the first group of friction members and the second group in the opposite directions to frictionally oppose relative horizontal movement of said housings, a member of substantially smaller diameter than said apertures and said aligned openings extending through said openings and apertures, a plurality of friction elements slidably mounted in said smaller housing and engaging said member, and spring means in said smaller housing engaging said friction elements and biasing them against said member.

References Cited by the Examiner
UNITED STATES PATENTS

| | | | |
|---|---|---|---|
| 2,896,937 | 7/1959 | Miller | 267—1 |
| 3,116,813 | 1/1964 | Ziegler | 188—1 |
| 3,141,523 | 7/1964 | Dickie | 188—1 |
| 3,145,012 | 8/1964 | Kfoury | 267—1 |

MILTON BUCHLER, *Primary Examiner.*

DUANE A. REGER, *Examiner.*